US012596637B2

(12) United States Patent
Gandhi et al.

(10) Patent No.: US 12,596,637 B2
(45) Date of Patent: *\*Apr. 7, 2026*

(54) OPTIMZING SYNTHETIC TESTS ACROSS CLOUD, ENTERPRISE, AND USER AGENTS

(71) Applicant: Cisco Technology, Inc., San Jose, CA (US)

(72) Inventors: Indermeet Singh Gandhi, San Jose, CA (US); Hans Ashlock, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 307 days.

This patent is subject to a terminal disclaimer.

(21) Appl. No.: 18/218,732

(22) Filed: Jul. 6, 2023

(65) Prior Publication Data

US 2025/0013560 A1      Jan. 9, 2025

(51) Int. Cl.
  *G06F 15/173*      (2006.01)
  *G06F 11/3668*      (2025.01)
  *G06F 11/3698*      (2025.01)
(52) U.S. Cl.
  CPC ...... *G06F 11/3688* (2013.01); *G06F 11/3698* (2025.01)

(58) Field of Classification Search
  CPC ......................... G06F 11/3688; G06F 11/3698
  See application file for complete search history.

(56) References Cited

U.S. PATENT DOCUMENTS

| | | | |
|---|---|---|---|
| 9,811,445 B2 | 11/2017 | Moretto et al. | |
| 10,402,301 B2 | 9/2019 | Qadri et al. | |
| 10,515,002 B2 | 12/2019 | Takawale et al. | |
| 11,099,237 B2 | 8/2021 | Nochilur et al. | |
| 12,284,105 B2 * | 4/2025 | Hulick, Jr. ............ | H04L 43/065 |
| 2019/0052551 A1 | 2/2019 | Barczynski et al. | |

* cited by examiner

*Primary Examiner* — Joseph R Maniwang
(74) *Attorney, Agent, or Firm* — Lee & Hayes, P.C.

(57)      ABSTRACT

In one embodiment, a device obtains testing parameters used by a plurality of agents in a network to perform testing with respect to an online application. The device identifies overlapping parameters among the testing parameters and generates a consolidated set of testing parameters for the overlapping parameters. The device configures the plurality of agents such that a singular testing agent performs testing with respect to the online application using the consolidated set of testing parameters instead of multiple testing agents performing testing with respect to the online application using the overlapping parameters.

20 Claims, 7 Drawing Sheets

100
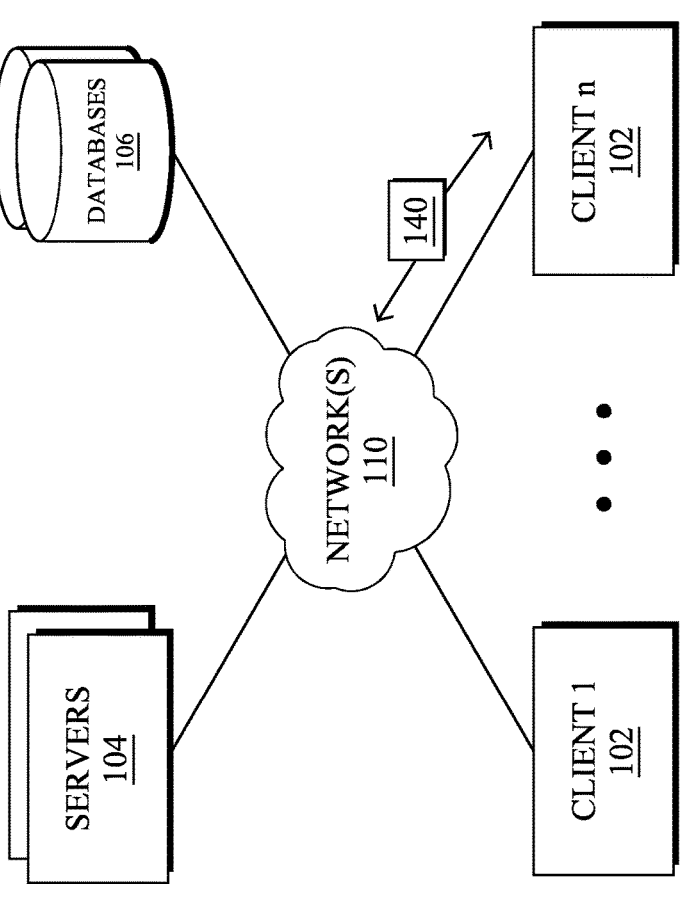
DATABASES
106
CLIENT n
102
140
NETWORK(S)
110
SERVERS
104
CLIENT 1
102
FIG. 1

400

Company A Tests
1. HTTP Tests - workday.com, salesforce.com, 1 min interval
2. TCP Tests - google.com, aws.com, 5 min interval
3. ICMP Test - azure.com, 5 min interval Company B Tests
1. HTTP Tests - workday.com, salesforce.com, 5 min interval
2. TCP Tests - google.com, 2 min interval
3. ICMP Test - aws.com, azure.com, 2 min interval Company Z Tests
1. HTTP Tests - sharepoint.com, salesforce.com, 5 min interval
2. TCP Tests - webex.com, 2 min interval
3. ICMP Test - aws.com, azure.com, 2 min interval

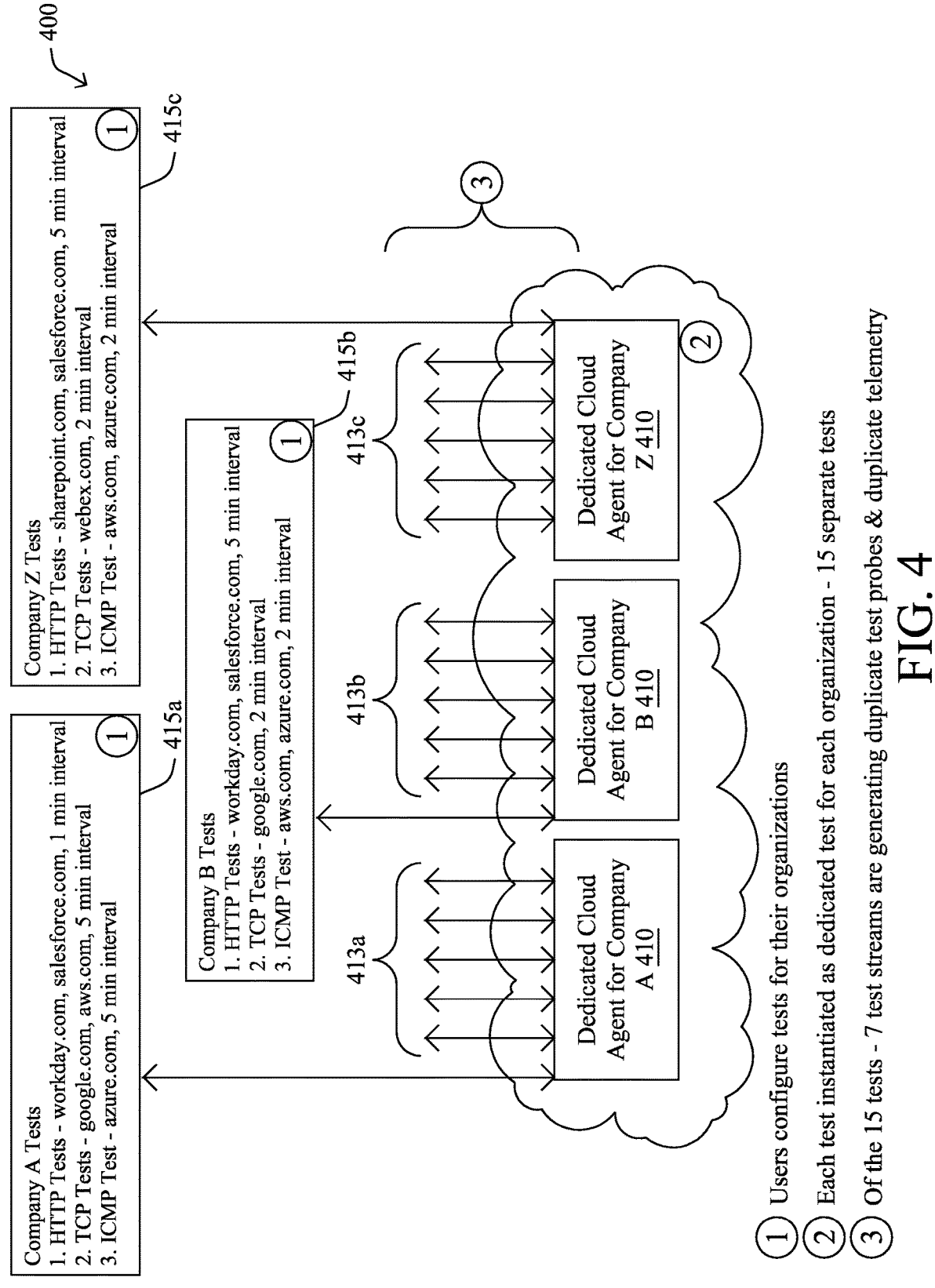

Dedicated Cloud Agent for Company A 410

Dedicated Cloud Agent for Company B 410

Dedicated Cloud Agent for Company Z 410

413a    413b    413c    415b    415a    415c

① Users configure tests for their organizations

② Each test instantiated as dedicated test for each organization - 15 separate tests ③ Of the 15 tests - 7 test streams are generating duplicate test probes & duplicate telemetry

FIG. 4

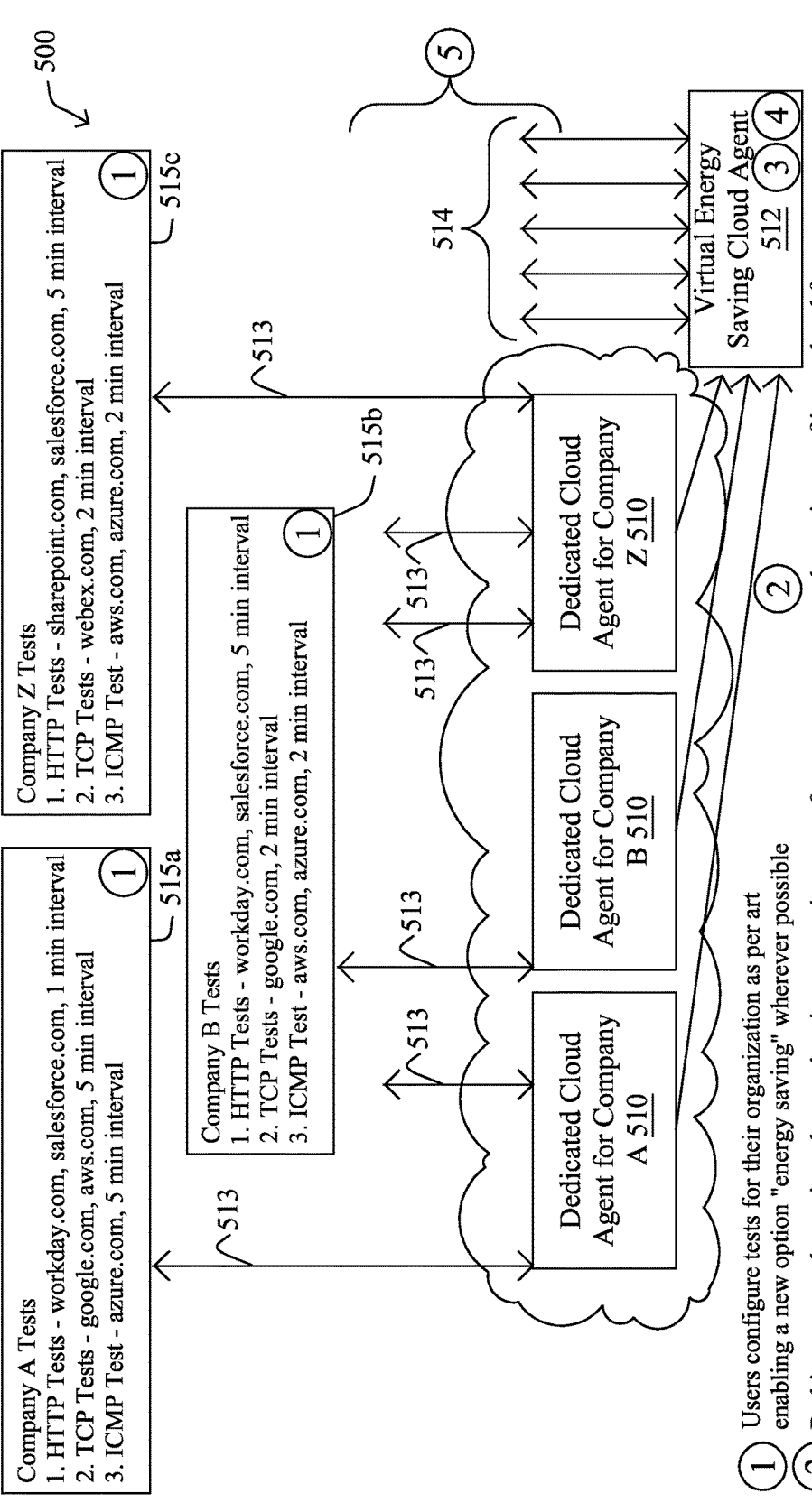

FIG. 5

Company A Tests
1. HTTP Tests - workday.com, salesforce.com, 1 min interval
2. TCP Tests - google.com, aws.com, 5 min interval
3. ICMP Test - azure.com, 5 min interval Company B Tests
1. HTTP Tests - workday.com, salesforce.com, 5 min interval
2. TCP Tests - google.com, 2 min interval
3. ICMP Test - aws.com, azure.com, 2 min interval Company Z Tests
1. HTTP Tests - sharepoint.com, salesforce.com, 5 min interval
2. TCP Tests - webex.com, 2 min interval
3. ICMP Test - aws.com, azure.com, 2 min interval Dedicated Cloud Agent for Company A 510

Dedicated Cloud Agent for Company B 510

Dedicated Cloud Agent for Company Z 510

Virtual Energy Saving Cloud Agent 512

① Users configure tests for their organization as per art enabling a new option "energy saving" wherever possible ② Probing system determines the overlapping tests using types & targets as common denominator of interval and frequency ③ Probing system creates virtualized energy saving cloud agent which comprises of all the tests (that are marked as energy saving enabled by customer), new interval & frequency (common denominator for each configured test)

④ Probing system runs the tests through the virtual energy saving cloud agent, organizes the test results & shares the test results per frequency & interval configured by each company. Ex. - run a HTTP test against Salesforce every 1 mins but report to company B & Z every 5 mins ⑤ Total number of tests & energy consumed reduced proportionally. Example - 15 tests reduced to 8.

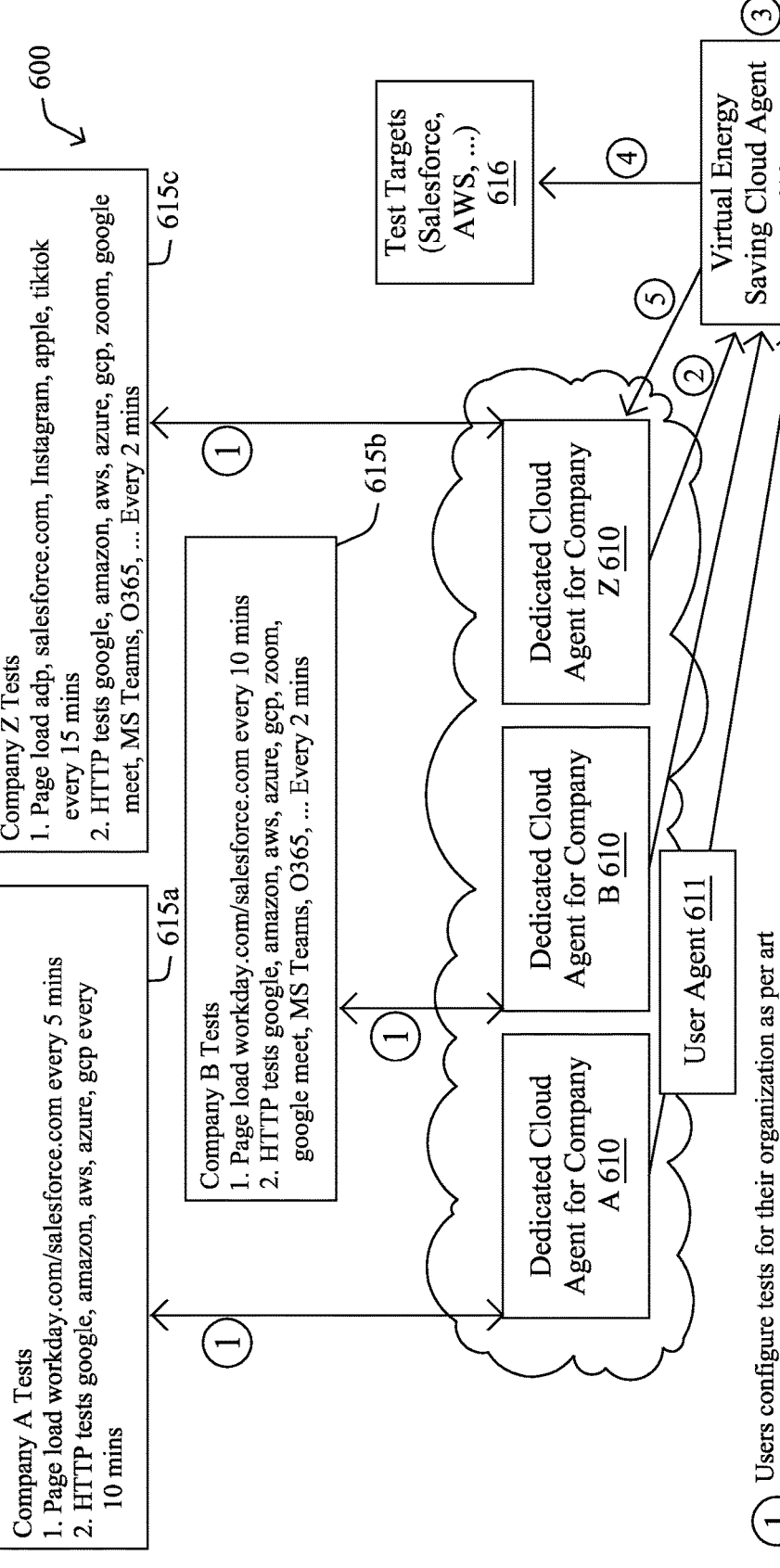

Company A Tests
1. Page load workday.com/salesforce.com every 5 mins
2. HTTP tests google, amazon, aws, azure, gcp every 10 mins 615a

Company B Tests
1. Page load workday.com/salesforce.com every 10 mins
2. HTTP tests google, amazon, aws, azure, gcp, zoom, google meet, MS Teams, O365, ... Every 2 mins 615b

Company Z Tests
1. Page load adp, salesforce.com, Instagram, apple, tiktok every 15 mins
2. HTTP tests google, amazon, aws, azure, gcp, zoom, google meet, MS Teams, O365, ... Every 2 mins 615c Dedicated Cloud Agent for Company A 610

Dedicated Cloud Agent for Company B 610

Dedicated Cloud Agent for Company Z 610

User Agent 611

Test Targets (Salesforce, AWS, ...) 616

Virtual Energy Saving Cloud Agent 612

(1) Users configure tests for their organization as per art enabling a new option "energy saving" wherever possible (2) Probing system determines the overlapping tests types & targets, common denominator of interval and frequency (3) Probing system creates virtualized energy saving cloud agent which comprises of all the tests (that are marked as energy saving enabled by customer), new interval & frequency (common denominator for each configured tests)

(4) Probing system runs the tests through the virtual energy saving cloud agent, organizes the test results & shares the test results per frequency & interval configured by each company. Ex. - run a page load test against Salesforce every 5 mins but report to company A every 5 mins, company B & Z every 10 and 15 mins respectively (5) Probing system provides computed savings from using shared testing to each organization

700

705

START

710

OBTAIN TESTING PARAMETERS

715

IDENTIFY OVERLAPPING TESTING PARAMETERS

720

GENERATE SET OF CONSOLIDATED TESTING PARAMETERS

725

CONFIGURE PERFORMANCE OF TESTING

730

END

OPTIMZING SYNTHETIC TESTS ACROSS CLOUD, ENTERPRISE, AND USER AGENTS

TECHNICAL FIELD

The present disclosure relates generally to computer networks, and, more particularly, to optimizing synthetic tests across cloud, enterprise, and user agents.

BACKGROUND

Synthetic Application Performance Monitoring (APM) has garnered increased interest in recent years due to its ability to simulate an expected path a user may take through an application. Synthetic APM can be facilitated by cloud agents, which are instances of an agent synthetic probing software that is hosted on a cloud infrastructure. These agents are used to monitor the performance of Internet infrastructure and applications from locations around the world. For example, the cloud agents generate synthetic probes which are then routed by the Internet. The cloud agents then measure the response from targets to derive performance telemetry.

Currently, an organization may sign up with a path probing service and configure their own desired probing tests, to evaluate the network connectivity between that organization and a given online service or application. In turn, the path probing service may execute these probing tests using agents that are dedicated to performing the testing on a per-organization basis. In many cases, though, multiple organizations may be running equivalent tests, meaning that they are generating network probes with the same characteristics (e.g., target server, protocol, packet settings, etc.) from the same agent locations, thereby consuming additional resources and generating largely redundant network telemetry.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 1 illustrates an example computer network;

FIG. 4 illustrates an example of multi-tenant test generation;

FIG. 5 illustrates an example methodology to leverage a virtual shared test agent in accordance with embodiments of the present disclosure;

FIG. 6 illustrates another example methodology to leverage a virtual shared test agent in accordance with embodiments of the present disclosure.

DESCRIPTION OF EXAMPLE EMBODIMENTS

Overview

Figure 2:
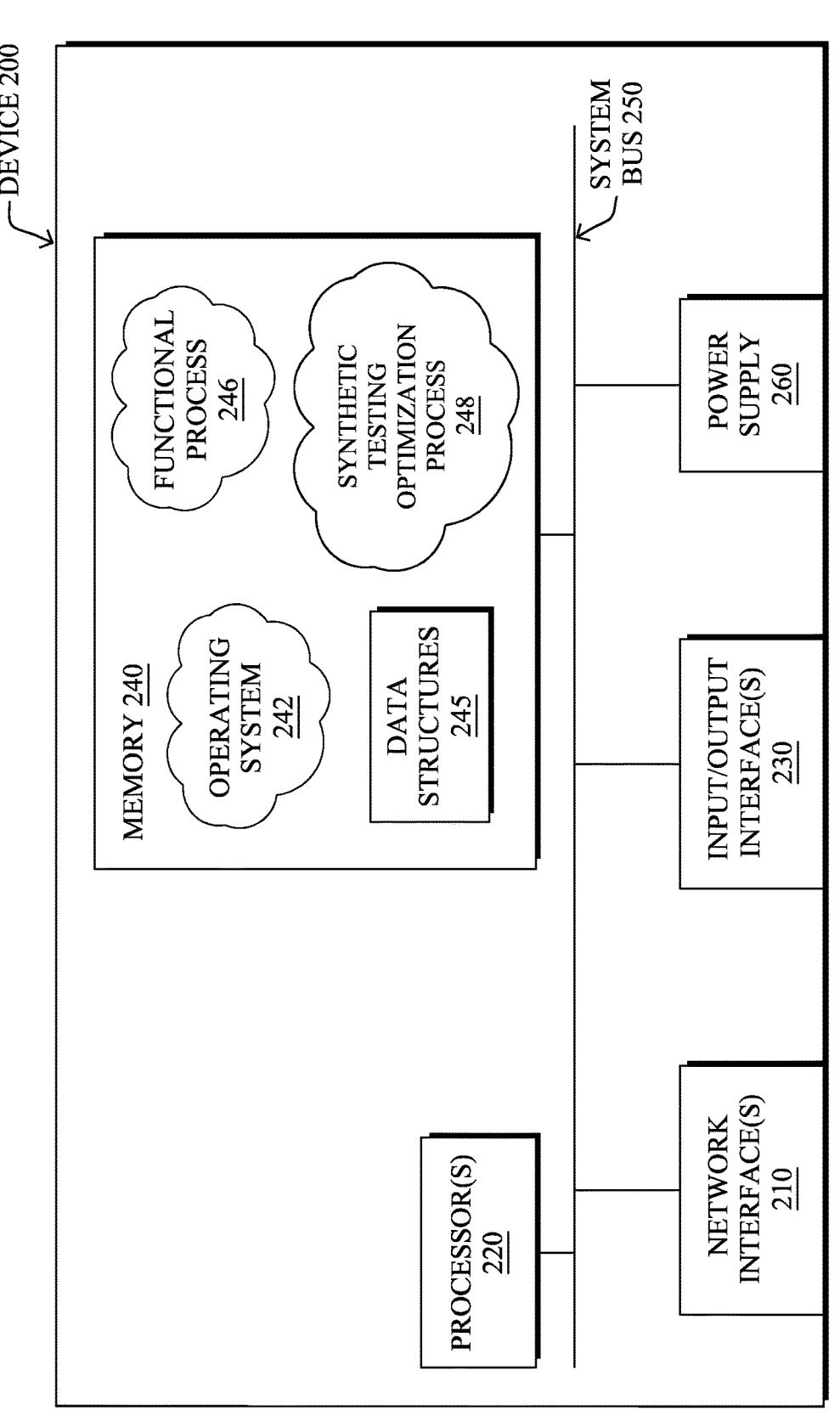
FIG. 2 illustrates an example computing device/node.

According to one or more embodiments of the disclosure, a device obtains testing parameters used by a plurality of agents in a network to perform testing with respect to an online application. The device identifies overlapping parameters among the testing parameters and generates a consolidated set of testing parameters for the overlapping parameters. The device configures the plurality of agents such that a singular testing agent performs testing with respect to the online application using the consolidated set of testing parameters instead of multiple testing agents performing testing with respect to the online application using the overlapping parameters.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on Wi-Fi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

FIG. 2 is a schematic block diagram of an example node/device 200 (e.g., an apparatus) that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative "synthetic testing optimization" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Observability Intelligence Platform—

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT)

operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a web-site is loading, how an application is performing, how a particular business transaction (or a particular type of business transaction) is being effected, and so on, whether for individual devices, a category of devices (e.g., type, location, capabilities, etc.), or any other suitable embodiment of categorical classification.

Figure 3:
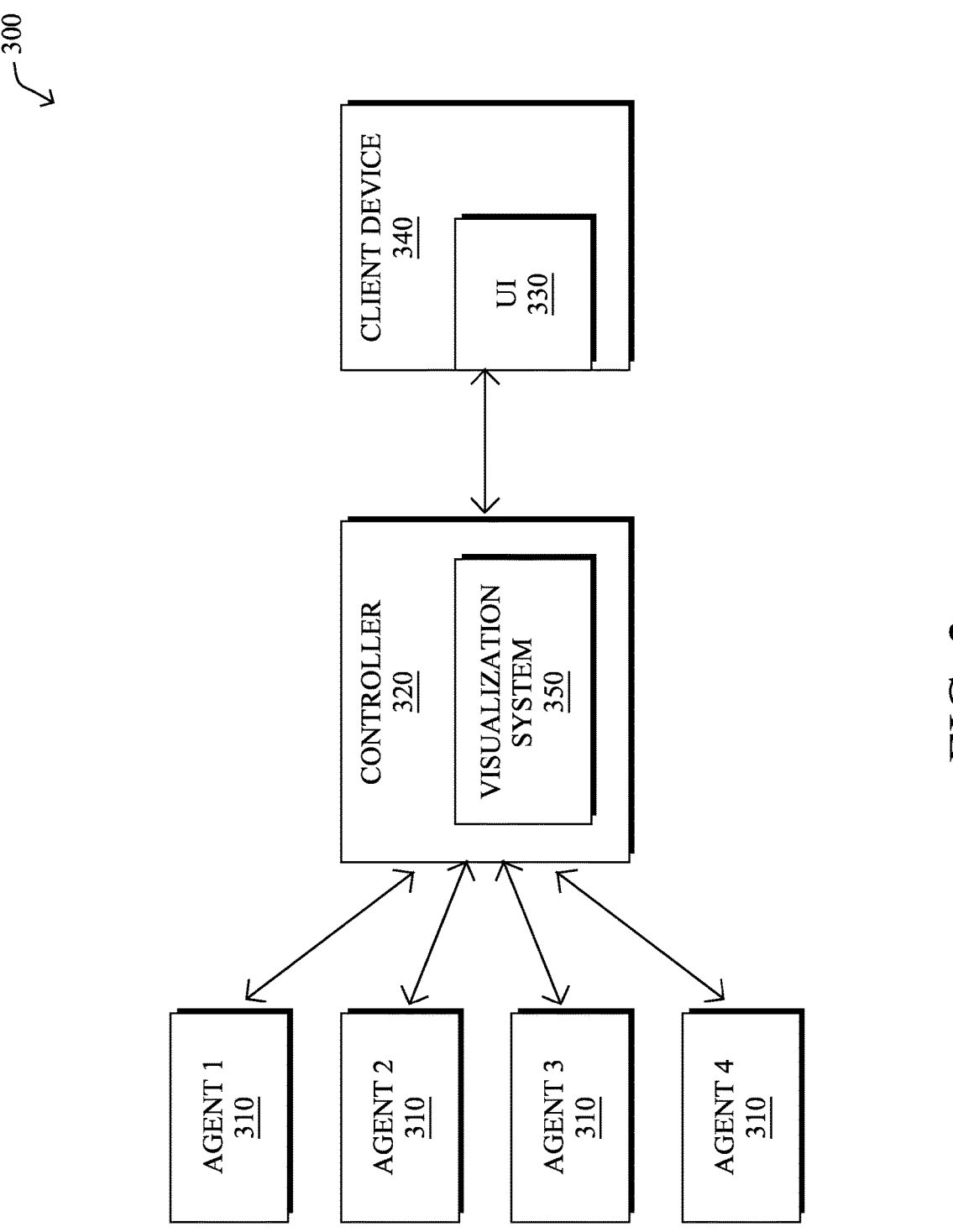
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents 310 and one or more servers/controllers 320. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller(s) 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform. The controller 320 may serve a browser-based user interface (UI) 330 that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, an instance of controller 320 may be hosted remotely by a provider of the observability intelligence platform 300. In an illustrative on-premises (On-Prem) implementation, an instance of controller 320 may be installed locally and self-administered.

The controllers 320 receive data from different agents 310 (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain embodiments, both self-learned baselines and configurable thresholds may be used to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the extensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

Continuing on, FIG. 4 illustrates an example of multitenant test generation. As in the case of FIG. 3, agents 410 may be probing agents that are part of a path probing system (e.g., ThousandEyes from Cisco Systems, Inc. or the like) that execute instances of agent synthetic probing software hosted on a cloud infrastructure provider such as Amazon Web Services™, Microsoft Azure™, or the like. Typically, agents 410 are used to monitor the performance of Internet infrastructure and applications from locations around the world.

As shown in FIG. 4, an organization (e.g., a customer) can sign up and setup their own set of targets, frequencies, and intervals for performance of synthetic testing operations. However, as is commonly done today, each organization runs their own tests 415a-415c independently using their own dedicated cloud agents 410, which may be configured by the path probing system. In many cases multiple organizations may be running equivalent tests, meaning that they're generating network probes with the same characteristics (target server, protocol, packet settings, etc.) from the same cloud agent locations.

The agents 410 generate synthetic probes which are then routed by the Internet along their target network paths. Agents 410 then measure the responses from the targets of this probing to derive performance telemetry (e.g., path loss, delay, jitter, etc.). Therefore, in many instances, agents 410 may end up generating the same types of network probes for different organizations and, thus, are generating redundant network telemetry. This means the energy used to generate cross-organizational network telemetry could be significantly optimized where there is any customer overlap, which is often the case as the targets of an organization's cloud agent tests are often external SaaS and cloud applications or servers shared by many different organizations.

More specifically, users in the different organizations (e.g., companies A, B, and Z shown) may configure tests 415a-415c for their respective organizations. The tests can be initiated as test streams 413a-413c that are generated by the respective cloud agents 410 for each organization and controlled by various parameters such as any or all of the following:

Target—the target destination of the path to be probed

Probe type—the protocol(s) used by the probe packets (e.g., HTTP, TCP, ICMP, etc.)

Probe frequency—how frequently an agent 410 should send out probes for a given test Etc.

In the example illustrated in FIG. 4, the total number of tests is equal to number of tests per organization*the number of organizations regardless of configuration, as is typically the case today. For example, in FIG. 4, there are three organizations that each request performance of five synthetic test streams 413a-413c. In accordance with the equation mentioned above, this yields a total of fifteen tests. However, some of these tests are redundant across the organizations, which leads to performance of duplicate tests and acquisition of redundant telemetry data. For example, if redundant tests were deduplicated, as described in more detail in connections with FIG. 5-FIG. 7, herein, only eight tests streams 413a-413c would be needed to achieve the same robustness of testing because seven test streams 413a-413c are duplicative.

It will be appreciated that the computation overhead of these approaches also increases as the number of participant organizations increases. Accordingly, the synthetic testing optimization functionality of the present disclosure may be enabled in a selectable manner (e.g., in response to users or organizations enabling energy saving operations or providing other indications to selectively enable the functionality described herein).

A key challenge that may arise in the above scenarios, and in synthetic testing environments in general, is providing a functionality by which redundant telemetry data generated by synthetic testing probes initiated by different organizations can be identified and/or enabled. However, having such functionality would allow for the deduplication of redundant telemetry data, thereby providing a savings in energy, processing power, and/or bandwidth consumption by agents 410 that are involved in synthetic testing operations. Accordingly, the present disclosure allows for identification of redundant telemetry data generated by synthetic testing probes initiated by different organizations and deduplication of the same to save energy without compromising on the test target, frequency and interval.

—Optimizing Synthetic Tests Across Cloud, Enterprise, and User Agents—

The techniques introduced herein allow for optimization of synthetic testing across cloud, enterprise, and user agents. More specifically, the techniques herein are able to conserve resources (e.g., energy, processing resources, etc.) by reducing execution of equivalent (e.g., redundant) synthetic tests performed by a plurality of organizations. For example, in current approaches, each organization runs their tests independently using their own dedicated cloud agents. In many cases-multiple organizations may be running equivalent tests, meaning that they're generating network probes with the same characteristics (target server, protocol, packet settings) from the same cloud agent locations. Because the agents generate synthetic probes which are then routed by the Internet and measure the response from targets to derive network performance telemetry, agents that are generating the same network probes are thus generating redundant network telemetry. This means the energy used to generate cross-organization network telemetry could be significantly optimized where there is any organizational overlap, which is often the case as the targets of an organization's cloud agent tests are often external SaaS and cloud applications or servers shared by many organizations. In contrast, the techniques herein allow deduplicating synthetic probe tests and the resulting telemetry to provide an option to customers to save energy without compromising on the test target, frequency, and interval of such tests.

Accordingly, the techniques herein propose the following operations, among others:

Configuring, by users and/or organizations, indications of performance of energy saving operations involving tests (e.g., synthetic probe tests);

Determining overlapping tests based on test types, test targets, test intervals, etc. to consolidate testing parameters;

Creating a virtualized cloud agent to handle the tests based on user enablement of aforementioned indications, testing intervals, and/or testing frequencies requested by users on a per organization basis;

Executing the tests using the created virtualized cloud agent with the consolidated testing parameters on a per organization basis;

Organizing results of the tests conducted using the consolidated testing parameters;

Reporting results of the consolidated tests to the organizations at frequencies and/or time intervals requested by such organizations to optimize performance of such tests; and/or Reporting energy and/or monetary savings that result from utilization of the techniques described herein to the organizations.

Illustratively, the techniques described herein may be performed by hardware, software, and/or firmware, such as in accordance with synthetic testing optimization process 248, which may include computer executable instructions executed by the processor 220 (or independent processor of interfaces 210) to perform functions relating to the techniques described herein.

Specifically, according to various embodiments, a device obtains testing parameters used by a plurality of agents in a network to perform testing with respect to an online application. The device identifies overlapping parameters among the testing parameters and generates a consolidated set of testing parameters for the overlapping parameters. The device configures the plurality of agents such that a singular testing agent performs testing with respect to the online application using the consolidated set of testing parameters instead of multiple testing agents performing testing with respect to the online application using the overlapping parameters.

Operationally, FIG. 5 illustrates an example methodology to leverage a virtual shared test agent in accordance with embodiments of the present disclosure. In FIG. 5, various organizations (e.g., businesses, schools, government entities, etc.), which are referred to in the alternative as a "Company" or "Companies," have agents 510 (e.g., cloud agents) that are executing various test streams 513 (e.g., synthetic tests) to perform sets of tests 515a-515c. As shown in FIG. 5, the tests 515a-515c can include various synthetic tests performed in accordance with different protocols (e.g., Hypertext Transfer Protocol (HTTP) tests, Transmission Control Protocol (TCP) tests, and/or Domain Name System (DNS) tests, etc.). These tests 515a-515c can be performed at different time intervals.

For example, in the case of tests 515a performed for Company A, various HTTP tests can be performed with a time interval/frequency of one minute, while various TCP tests and various DNS tests can be performed with a time interval/frequency of five minutes. With respect to Company B, various HTTP tests can be performed with a time interval/frequency of five minutes, while various TCP tests and various DNS tests can be performed with a time interval/frequency of two minutes. Finally, in this non-limiting example, with respect to Company Z, various HTTP tests can be performed with a time interval/frequency of five minutes, while various TCP tests and various DNS tests can be performed with a time interval/frequency of two minutes.

In some embodiments, users can configure the tests for the organizations by enabling an energy saving indication for one or more of the tests 515a-515c. For example, the organizations can opt-in to an energy saving mode with respect to one or more of the tests 515a-515c and/or test streams 513. Once the organization(s) have opted-in to the energy saving mode, the agents 510 can determine overlapping test types and targets associated with the tests 515a-515c and/or common denominators of the intervals and/or frequencies associated with the tests 515a-515c. For example, since Company A, Company B, and Company Z are all performing a HTTP test using salesforce.com, the HTTP test using salesforce.com is designated as an overlapping test. However, it is noted that since the interval for the HTTP test using salesforce.com is one minute for Company A and five minutes for Company B and Company Z, results of this particular test will be reported to Company A every minute and to Company B and Company Z every five minutes. Although not explicitly described in the specification, it will be appreciated that similar designations with respect to overlapping tests can be made for the other (e.g., the TCP, DNS, etc.) tests 515a-515c.

A device (one of the agents 510, a controller 320, a processor 220, etc.) creates a virtualized energy saving cloud agent 512. The virtualized energy saving cloud agent 512 is configured with the overlapping test streams 514 that include overlapping test streams. That is, overlapping test streams 514 that have been marked for energy savings measures and were determined to be overlapping tests by the organizations are provided to the virtualized energy saving cloud agent 512. In some embodiments, the virtualized energy saving cloud agent 512 can determine common denominators (e.g., time intervals, frequencies, targets, etc.) for the overlapping tests that have been marked for energy savings measures.

The overlapping tests (e.g., the overlapping test streams 514) are then executed by the virtualized energy saving cloud agent 512. The virtualized energy saving cloud agent 512 can monitor performance of the tests 515a-515c and organize results of the tests 515a-515c corresponding to the overlapping test streams 514. The virtualized energy saving cloud agent 512 then shares results of the tests 515a-515c with the organizations (e.g., with Company A, Company B, Company Z, etc.) according to the frequencies, intervals, and/or targets that are configured for each organization. For example, the virtualized energy saving cloud agent 512 will share the results of the HTTP test using salesforce.com with Company A at one minute intervals and will share the results of the HTTP test using salesforce.com with Company B and Company Z at five minute intervals, etc.

In some embodiments, the virtualized energy saving cloud agent 512 can share energy savings information with one or more of the organizations. In some embodiments, the energy savings information can include a quantity of deduplicated tests 515a-515c and/or a quantity of test streams 514 that were handled by the virtualized energy saving cloud agent 512 as opposed to being handled by the agents 510. For example, the virtualized energy saving cloud agent 512 can report to the organizations that eight test streams 514 were utilized as opposed to fifteen test streams 413a-413c in the example of FIG. 3. In addition to, or in the alternative, the virtualized energy saving cloud agent 512 can share a cost saving (e.g., in dollars or other currency) realized by the organizations as a result of the deduplication of tests 515a-515c and/or consolidation of test streams 514.

In order to more clearly elucidate the processes performed herein, a non-limiting example using the numbers associated with the operations illustrated in FIG. 5 is presented below:

At operation (1), users configure tests for their organization while enabling the energy saving mode.

At operation (2), the agents 510 report the parameters of their configured probing tests (e.g., targets, types, frequencies, etc.), allowing the probing system to determine the overlapping parameters, as well as potentially a common denominator of interval and/or frequency for the tests.

At operation (3), the probing system instantiates a virtualized energy saving cloud agent 512 and configures it to perform combined probing tests for any or all of the tests (that are marked as energy saving enabled by the organizations). For example, rather than conducting separate HTTP tests of Salesforce for both Company A, B, and C, virtual energy saving cloud agent 512 may instead conduct a single test on behalf of all three organizations at once. In some embodiments, a combined probing test may also utilize an interval and frequency that are common denominators of those of the original tests. For instance, since Company A executes its HTTP tests of Salesforce every minute, while Company B and Company Z do so every five minutes, agent 512 may utilize a probing interval of one interval for its combined HTTP test of Salesforce.

At operation (4), the virtual energy saving cloud agent 512 runs the combined tests 515a-515c, organizes the results of the tests 515a-515c, and shares the results of the tests 515a-515c per frequency or interval as configured by each organization. For example, the virtual energy saving cloud agent 512 may perform HTTP-based probing tests against Salesforce every minute (as requests by Company A), but only report test results to company B and Z every five minutes, etc.

At operation (5), the virtual energy saving cloud agent 512 may also share with each organization the energy, resources, or other cost savings associated with sharing the tests. In the non-limiting example discussed above in connection with FIG. 3, the total number of tests 515a-515c and data streams 514 was reduced from fifteen to eight and this information may then be shared with each organization.

FIG. 6 illustrates another example methodology to leverage a virtual shared test agent in accordance with embodiments of the present disclosure. The elements illustrated in FIG. 6 may be analogous to similar numbered elements in FIG. 5. For example, the agents 610 may be analogous to the agents 510, the virtual energy saving cloud agent 612 may be analogous to the virtual energy saving cloud agent 512, and the tests 615a-615c may be analogous to the tests

515a-515c of FIG. 5. Further, the operations (1)-(5) may be analogous to the operations (1)-(5) discussed above in connection with FIG. 5.

In the embodiment illustrated in FIG. 6, the principles described above in connection with FIG. 5 are extended to sharing testing (e.g., synthetic tests) between enterprise agents 610 installed inside enterprise locations (e.g., offices, campuses, branches, etc.) and user agents 611 (e.g., agents installed on a user laptop, etc.). In these embodiments, when users are not at enterprise locations (e.g., a user is at home), an agent associated with the user's device may be configured to run a full (or nearly full) suite of tests 615a-615c, such as, but not limited to, Wi-Fi tests, HTTP page load tests, DNS tests, etc.

However, when the user is at an enterprise location, the virtual energy saving cloud agent 612 may be employed to optimize tests 615a-615c to avoid running tests 615a-615c that overlap with tests 615a-615c that are run by enterprise agents 610. For example, if the user agent 611 is configured to run a HTTP test using google.com and the enterprise agent 610 is also configured to run a HTTP test using google.com, the user agent 611 would not be allowed to run the test and, instead the enterprise agent 610 runs the test and the results of the test are provided to the user agent 611 in a path visualization view.

Figure 7:
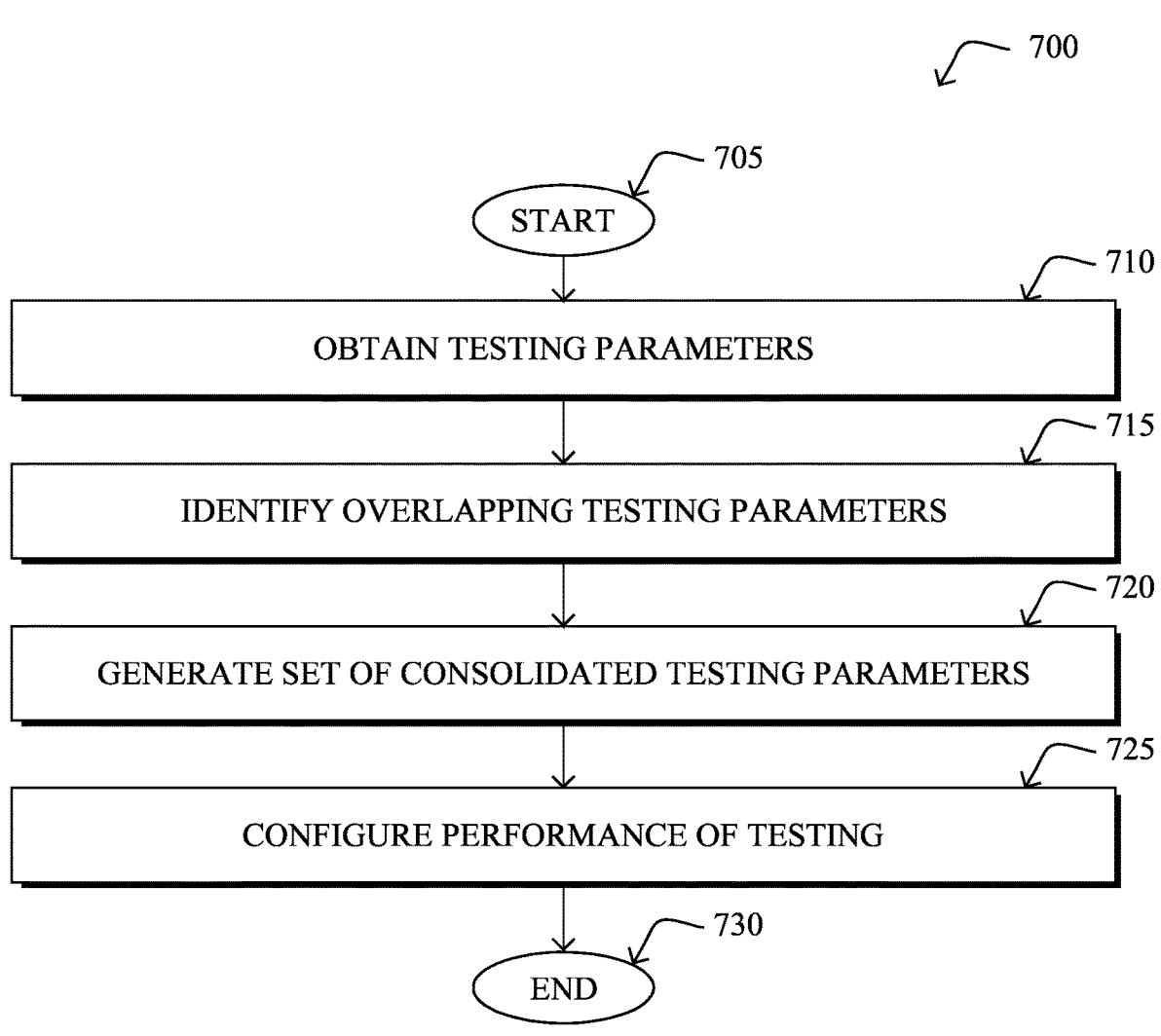
FIG. 7 illustrates an example simplified procedure for optimizing synthetic tests across cloud, enterprise, and user agents.

FIG. 7 illustrates an example simplified procedure 700 (e.g., a method) for optimizing synthetic tests across cloud, enterprise, and user agents, in accordance with one or more embodiments described herein.

For example, a non-generic, specifically configured device for optimizing synthetic tests across cloud, enterprise, and user agents (e.g., device 200), may perform procedure 700 by executing stored instructions (e.g., synthetic testing optimization process 248). The procedure 700 may start at step 705, and continues to step 710, where, as described in greater detail above, the device (e.g., a controller, processor, etc.) may obtain, for each of a plurality of agents in a network, testing parameters used by that agent to perform testing with respect to an online application. In various embodiments, the plurality of agents can be associated with different organizations, as discussed above.

At step 715, as detailed above, the device may identify overlapping parameters among the testing parameters. As discussed above, the testing parameters may indicate a particular protocol to be used to perform the testing (e.g., a HTTPS protocol, a TCP protocol, a DNS protocol, etc.). In the various embodiments, the testing parameters can indicate a frequency to perform the testing and/or a time interval between the testing At step 720, the device may generate a consolidated set of testing parameters for the overlapping parameters. In various embodiments, the consolidated set of testing parameters can be based on an opt-in performed by at least one agent among the plurality of agents.

At step 725, as detailed above, the device may configure the plurality of agents such that a singular testing agent performs testing with respect to the online application using the consolidated set of testing parameters instead of multiple testing agents performing testing with respect to the online application using the overlapping parameters provide an indication that the particular trainer node is a root cause of the degradation. In various embodiments, the singular testing agent can be a virtual cloud agent. Embodiments are not so limited, however, and in some embodiments, the singular testing agent can a user agent deployed on a user device. As discussed above, the device may compute an energy savings associated with using the consolidated set of testing parameters and/or provide an indication of the energy savings for display by, for example, a user on a graphical user interface.

In various embodiments, a first agent in the network can request performance of the testing at a first time interval and a second agent in the network can request performance of the testing at a second time interval. In such embodiments, the method can further include report a result of the testing to the first agent upon expiry of the first time interval and report the result of the testing to the second agent upon expiry of the second time interval.

Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for optimizing synthetic tests across cloud, enterprise, and user agents associated with different organizations. More specifically, by generating a consolidated set of testing parameters for the overlapping parameters and configuring, by the device, the plurality of agents such that a singular testing agent performs testing with respect to the online application using the consolidated set of testing parameters instead of multiple testing agents performing testing with respect to the online application using the overlapping parameters, energy consumption associated with performing synthetic testing operations with respect to an online application.

While there have been shown and described illustrative embodiments that provide for optimizing synthetic tests across cloud, enterprise, and/or user agents associated with different organizations, it is to be understood that various other adaptations and modifications may be made within the spirit and scope of the embodiments herein. For example, while certain embodiments are described herein with respect to machine learning workloads directed towards model training, the techniques herein are not limited as such and may be used for other types of machine learning tasks, such as making inferences or predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, performed at a computing device comprising a processor and memory configured to store the method, which is executable by the processor, comprising:

obtaining, by the computing device and for each of a plurality of agents in a network, testing parameters used by that agent to perform testing with respect to an online application;

identifying, by the computing device, overlapping parameters among the testing parameters;

generating, by the computing device, a consolidated set of testing parameters for the overlapping parameters; and providing, by the computing device and to a display, one or more indications that are generated based on test results from testing performed with respect to the online application using the consolidated set of testing parameters.

2. The method of claim 1, wherein the testing parameters indicate a particular protocol to be used to perform the testing or a frequency to perform the testing or a time interval between the testing.

3. The method of claim 1, wherein a first agent in the network requests performance of the testing at a first time interval and a second agent in the network requests performance of the testing at a second time interval, and wherein the method further comprises reporting a result of the testing to the first agent upon expiry of the first time interval and reporting the result of the testing to the second agent upon expiry of the second time interval.

4. The method of claim 1, further comprising generating, by the computing device, the consolidated set of testing parameters based on an opt-in performed by at least one agent among the plurality of agents.

5. The method of claim 1, wherein a singular testing agent performs the testing with respect to the online application using the consolidated set of testing parameters instead of multiple testing agents performing testing with respect to the online application using the overlapping parameters.

6. The method of claim 5, wherein the singular testing agent comprises a virtual cloud agent or a user agent deployed on a user device.

7. The method of claim 1, wherein the computing device is a controller that manages the plurality of agents.

8. The method of claim 1, further comprising computing, by the computing device, an energy savings associated with using the consolidated set of testing parameters and providing an indication of the energy savings for display.

9. The method of claim 1, wherein the plurality of agents are associated with different organizations.

10. The method of claim 1, wherein the testing comprises a Wi-Fi test, a Hypertext Transfer Protocol load time test, or a domain name service test.

11. An apparatus, comprising:

a network interface to communicate with a computer network;

a processor coupled to the network interface and configured to execute one or more processes; and a memory configured to store a process that is executed by the processor, the process when executed configured to:

obtain, for each of a plurality of agents in a network, testing parameters used by that agent to perform testing with respect to an online application;

identify overlapping parameters among the testing parameters;

generate a consolidated set of testing parameters for the overlapping parameters; and provide, to a display, one or more indications that are generated based on test results from testing performed with respect to the online application using the consolidated set of testing parameters.

12. The apparatus of claim 11, wherein the testing parameters indicate a particular protocol to be used to perform the testing or a frequency to perform the testing or a time interval between the testing.

13. The apparatus of claim 11, wherein a first agent in the network requests performance of the testing at a first time interval and a second agent in the network requests performance of the testing at a second time interval, and wherein the process, when executed, is further configured to report a result of the testing to the first agent upon expiry of the first time interval and report the result of the testing to the second agent upon expiry of the second time interval.

14. The apparatus of claim 11, wherein the process, when executed, is configured to generate the consolidated set of testing parameters based on an opt-in performed by at least one agent among the plurality of agents.

15. The apparatus of claim 11, wherein a singular testing agent performs the testing with respect to the online application using the consolidated set of testing parameters instead of multiple testing agents performing testing with respect to the online application using the overlapping parameters.

16. The apparatus of claim 15, wherein the singular testing agent comprises a virtual cloud agent or a user agent deployed on a user device.

17. The apparatus of claim 11, wherein the apparatus is a controller that manages the plurality of agents.

18. The apparatus of claim 11, wherein the plurality of agents are associated with different organizations.

19. The apparatus of claim 11, wherein the testing comprises a Wi-Fi test, a Hypertext Transfer Protocol load time test, or a domain name service test.

20. A tangible, non-transitory, computer-readable medium storing program instructions that cause a device to execute a process comprising:

obtaining, by the device and for each of a plurality of agents in a network, testing parameters used by that agent to perform testing with respect to an online application;

identifying, by the device, overlapping parameters among the testing parameters;

generating, by the device, a consolidated set of testing parameters for the overlapping parameters; and providing, by the device and to a display, one or more indications that are generated based on test results from testing performed with respect to the online application using the consolidated set of testing parameters.

* * * * *